G. P. ALTENBERG.
VACUUM INSULATED VESSEL AND CASING THEREFOR.
APPLICATION FILED MAR. 10, 1917.
1,293,294.
Patented Feb. 4, 1919.
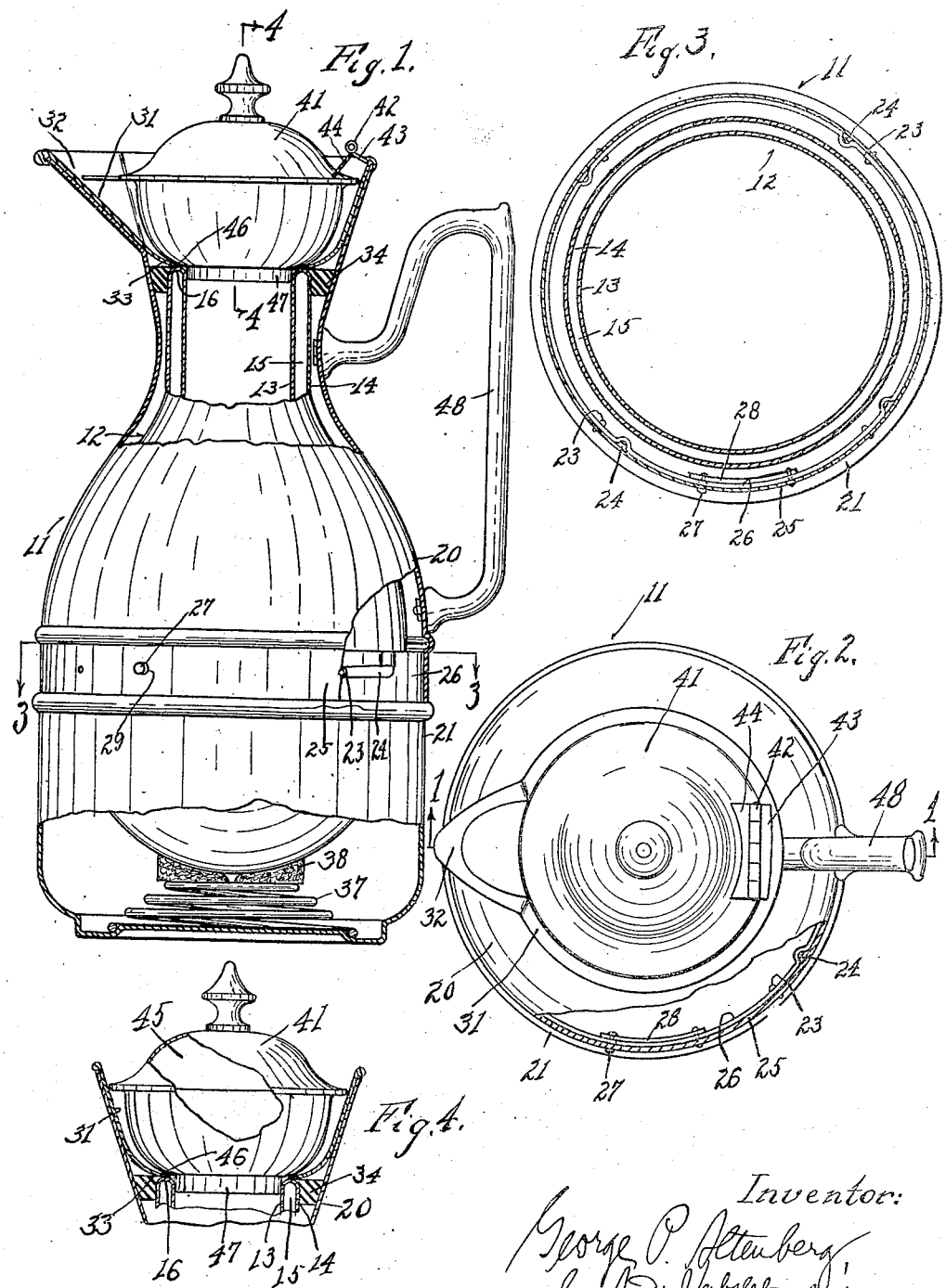
Inventor:
George P. Altenberg,

UNITED STATES PATENT OFFICE.

GEORGE P. ALTENBERG, OF CINCINNATI, OHIO, ASSIGNOR TO THE ICY-HOT BOTTLE COMPANY, OF CINCINNATI, OHIO, A CORPORATION OF WEST VIRGINIA.

VACUUM-INSULATED VESSEL AND CASING THEREFOR.

1,293,294.  Specification of Letters Patent.  Patented Feb. 4, 1919.

Application filed March 10, 1917. Serial No. 154,028.

*To all whom it may concern:*

Be it known that I, GEORGE P. ALTENBERG, a citizen of the United States, residing at Cincinnati, in the county of Hamilton and State of Ohio, have invented certain new and useful Improvements in Vacuum-Insulated Vessels and Casings Therefor, of which the following is a specification.

My invention relates to vacuum-insulated pots or pitchers, or similar vessels, hereinafter for convenience referred to as pots, adapted for serving coffee, chocolate, tea, milk, cream, or other beverages.

It is the object of my invention to provide a heat insulated vessel with a casing provided with a pouring wall sloping upwardly and radially outwardly and surrounding the mouth of the vessel and having a lip at its lower inner edge which forms a continuation of the pouring wall and coacts with the mouth of the vessel, and means between the casing and vessel for causing pressure between said mouth and lip to form a close joint therebetween and provide an all metal and glass contact for the liquid poured into and out of the vessel.

The invention will be further readily understood from the following description and claims, and from the drawing, in which latter:

Figure 1 is a side elevation of a pot embodying my invention, partly broken away, and partly shown in central vertical section on the line 1—1 of Fig. 2.

Fig. 2 is a plan view of the same, partly broken away.

Fig. 3 is a cross-section of the same, taken in the plane of the line 3—3 of Fig. 1; and Fig. 4 is a vertical axial section of the same, taken in the plane of the line 4—4 of Fig. 1.

The pot comprises a casing exemplified at 11 and a vessel exemplified at 12, the vessel being shown as a heat insulated vessel comprising an inner wall 13 and an outer wall 14, having a vacuum-insulated space 15 therebetween, the inner and outer walls being connected at the mouth of the vessel by an annular cross-seal 16. The vessel is of frangible material, such as glass.

The cross-seal is in practice liable to have variations therein in a plane perpendicular to the axis of the vessel, owing to the usual methods of manufacture of vessels of this character.

In the present exemplification, the casing for the vessel comprises an upper member 20 and a lower member 21, within which the vessel is received. The casing members are detachably connected by suitable means, which have the function of drawing the casing members one toward the other, exemplified as bayonet connections comprising inwardly extending pins 23 rigidly secured to the upper member and received in bayonet slots 24 in the lower member, the pins being secured in a flange 25 of the upper member and the slots located in a flange 26 of the lower member, said flanges being telescopingly arranged when the casing members are assembled. A locking pin 27 on a spring strip 28 secured to the inner face of the lower member, projects through a suitable aperture in said lower member and coacts with the wall of a locking aperture 29 in the flange 25 of the upper member for locking the casing members in connected relations.

The casing is provided with a pouring wall 31, shown as a downwardly extending inwardly sloping closed wall, provided with a pouring channel 32, the said wall terminating at its lower end in an inner lateral preferably slightly downwardly extending lip 33, exemplified as a continuation of said downwardly extending inwardly sloping closed pouring wall, the said lip being a resilient lip formed of resilient material, as for example, German silver, and is preferably reduced taperingly in cross-section toward its free edge for aiding in the conforming of said lip to the upper end or cross-seal of the vessel mouth, and forming intimate contact therewith throughout its circumference. The resilience of the lip permits it to adapt itself to any inequalities or any irregularities there may be between the vessel and lip.

The mouth of the vessel is suitably centered with relation to the lip 33, as by means of a cushion-ring 34, instanced as a rubber ring, received under the pouring wall between the outer face of the neck of the vessel and the inner face of the neck of the casing. In order to exert pressure between the vessel and the lip 33 of the pouring wall, I provide a spring 37, shown as a conical spiral spring, on which there is located a pad 38, exemplified as a felt pad, the bottom of the vessel resting on the pad, and the spring urging the vessel toward said lip, the spring being also compressed by the action of the connection between the casing members.

The pouring well and lip projecting therefrom preferably have a continuous downwardly and inwardly sloping face and connect with the downwardly and inwardly sloping face of the cross-seal at the mouth of the vessel for readily draining any liquid thereon into the vessel and preventing the formation of puddles or rings of liquid at or above said mouth.

The casing is preferably provided with a cover 41, exemplified as hinged to the casing by means of a hinge 42, the butts 43 and 44 of the hinge being respectively secured to the rear upper portion of the pouring wall of the casing and to the cover, the cover being so arranged as to readily swing inwardly and downwardly above the mouth of the vessel. The cover is instanced as a hollow cover having a dead air space 45 between the upper and lower walls thereof. The lower wall of the cover is provided with a cross-sectionally rounded annular closing face 46 arranged to contact the lip 33 at the mouth of the vessel, for forming a metal to metal closure at said mouth. Said cover is shown as having an annular downwardly projecting portion 47, acting as a stopper, received within the mouth of the vessel.

The casing may be provided with a suitable handle 48.

Having thus fully described my invention, what I claim as new and desire to secure by Letters Patent, is:

1. In combination, a vessel comprising an inner wall and an outer wall connected at the mouth of the vessel and having a vacuum-insulated space between said walls, a casing for said vessel provided with a lip removably received over and around said mouth and having a radially outwardly and upwardly extending wall receding outwardly from said outer wall and forming a drain-wall sloping toward said outer wall and mouth, means for repeated use between the sides of said vessel and casing for repeated axially positioning of said mouth with relation to said lip, and resilient means between sad casing and vessel pressing said mouth and lip toward one another.

2. In combination, a vessel comprising an inner wall and an outer wall connected at the mouth of the vessel and having a vacuum-insulated space between said walls, a pluripart casing for said vessel provided with a lip removably received over said mouth and having a radially outwardly and upwardly extending wall receding outwardly away from said outer wall and forming a drain-wall sloping toward said outer wall and mouth, releasable means between the sides of said vessel and casing for axially positioning said mouth with relation to said lip, and means between the parts of said casing and vessel for resiliently holding said mouth and lip toward one another.

3. In combination, a vessel comprising an inner wall and an outer wall connected at the mouth of the vessel by a cross-seal and having a vacuum-insulated space between said walls, a casing for said vessel provided with a resilient lip releasably received above and around said cross-seal, a radially outwardly and upwardly extending wall receding outwardly away from said outer wall and forming a drain-wall sloping toward said mouth surrounding said resilient lip, and resilient means between the bottoms of said vessel and casing for pressing said mouth and lip toward one another, whereby to cause pressure on said resilient lip by said cross-seal.

4. In combination, a vessel comprising an inner wall and an outer wall connected at the mouth of the vessel and having a vacuum-insulated space between said walls, a casing for said vessel provided with a lip releasably received over and around said mouth and having a radially outwardly and upwardly extending wall receding outwardly away from said outer wall and forming a drain-wall sloping toward said outer wall and mouth, a resilient ring about said vessel proximate to said mouth releasably located between said vessel and said casing under said drain-wall, and means for pressing said mouth and lip toward one another.

5. In combination, a vessel comprising an inner wall and an outer wall connected at the mouth of the vessel and having a vacuum-insulated space between said walls, a casing for said vessel provided with a lip releasably received over and around said mouth and having a radially outwardly and upwardly extending wall receding outwardly away from said outer wall and forming a drain-wall sloping toward said outer wall and mouth, a resilient ring about said vessel proximate to said mouth releasably located between said vessel and said casing under said drain-wall, means for pressing said mouth and lip toward one another, whereby to press said resilient ring in the space between said mouth and lip, and a cover pivoted to said casing and received within said drain-wall for closing said mouth.

In testimony whereof I have hereunto signed my name in the presence of two subscribing witnesses.

GEORGE P. ALTENBERG.

Witnesses:
M. F. HAWKINS,
DAWSON E. BRADLEY.